United States Patent [19] [11] 3,758,048

Sugaya et al. [45] Sept. 11, 1973

[54] TAPE CASSETTE

[75] Inventors: Hiroshi Sugaya, Suita; Hideki Sakumoto, Moriguchi, both of Japan

[73] Assignee: Matsushita Electric Industrial Co., Ltd., Osaka, Japan

[22] Filed: Dec. 21, 1970

[21] Appl. No.: 100,336

[30] Foreign Application Priority Data

Dec. 23, 1969 Japan ........ 44/556
Mar. 4, 1970 Japan ........ 45/18891
June 18, 1970 Japan ........ 45/53770

[52] U.S. Cl. ........ 242/192, 242/198, 242/199, 242/210

[51] Int. Cl. . G11b 15/32, G11b 23/10, B65h 17/08

[58] Field of Search ........ 242/199, 200, 198, 242/197, 192, 71.2, 210, 204, 75.41; 274/4 C, 11 C; 352/78 R, 72

[56] References Cited

UNITED STATES PATENTS

| | | | |
|---|---|---|---|
| 3,520,495 | 7/1970 | Sotani | 242/199 X |
| 3,140,832 | 7/1964 | Cech | 242/199 |
| 3,497,157 | 2/1970 | Hanes et al. | 242/192 |
| 3,593,946 | 7/1971 | Shardlow | 242/192 |
| 3,130,975 | 4/1964 | Proctor | 352/78 R |
| 1,691,414 | 11/1928 | Thornton | 242/192 X |

*Primary Examiner*—George F. Mautz
*Attorney*—Stevens, Davis, Miller & Mosher

[57] ABSTRACT

A tape cassette for magnetic recording and reproducing apparatus, wherein tape-supply and take-up reels are rotatably accommodated in a cassette body, the outer peripheries of the flanges of said reels are partially exposed to the exterior of said cassette body, and said flanges are mechanically engageable at the exposed parts with a driving roller of said recording and reproducing apparatus, thereby driving both said reels.

3 Claims, 15 Drawing Figures

TAPE CASSETTE

This invention relates to tape cassettes for magnetic recording and reproducing apparatus, and provides, with a simple construction, a tape cassette in which the traveling of a tape is smooth and which is easily mounted on the body of a magnetic recording and reproducing apparatus.

Various types of tape cassettes have heretofore been suggested. In any types, however, the tape-supply and take-up reels accommodated in a cassette have been constructed so as to be brought into engagement with the take-up and supply shafts of a magnetic recording and reproducing apparatus, respectively, when used.

Accordingly, for mounting the cassette onto the apparatus, it has been impossible to be of a type other than the type in which the cassette is placed on the apparatus from above or the type in which after the cassette is mounted, the take-up and supply shafts are moved upwards to be engaged with the supply and take-up reels, respectively. The construction has also been complicated.

This invention solves these problems, and has the principal object in providing a tape cassette which may be easily mounted on and removed from a magnetic recording and reproducing apparatus.

Another object of this invention resides in a tape cassette which, with a simple construction, may be easily engaged with and disengaged from a tape-driving system of a magnetic recording and reproducing apparatus and which, in turn, simplifies the construction of the tape-driving system.

Still another object of this invention resides in a tape cassette which is made smaller in size.

This invention will now be described with reference to the accompanying drawings, in which.

Figure 1:
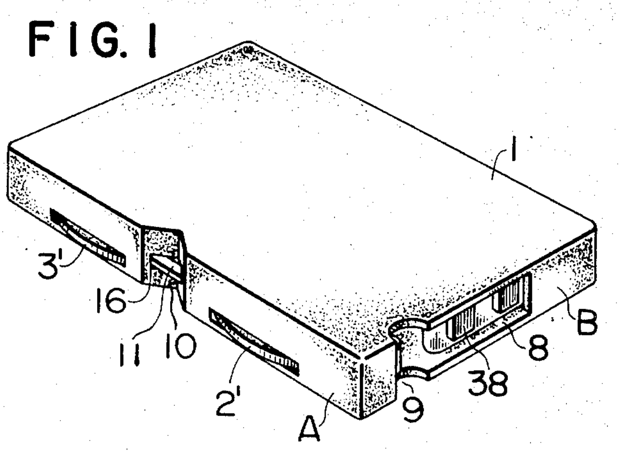
FIG. 1 is a perspective view of a cassette embodying this invention.
Figure 2:
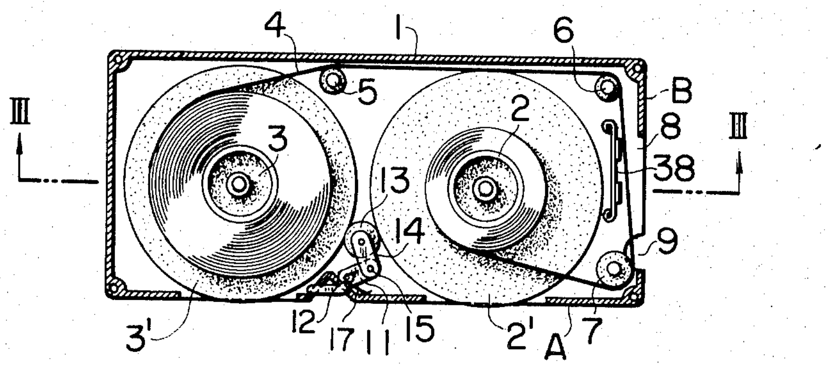
FIG. 2 is a sectional view, in plan, of the embodiment in FIG. 1.
Figure 3:
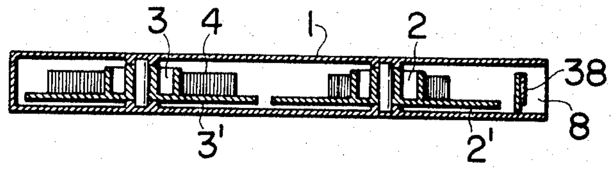
FIG. 3 is a sectional view taken along a line III—III in FIG. 2.

Referring to FIGS. 1 to 3, numeral 1 designates a tape-cassette body, in which a take-up reel 2 and a supply reel 3 are rotatably mounted, respectively.

The reels 2 and 3 have reel flanges 2′ and 3′ on only one side, respectively, with the respective outer peripheries protruding outwardly from a side A of the tape-cassette body.

A magnetic tape 4 from the supply reel 3 is guided so as to travel, through guide pins or rollers 5, 6 and a pinch roller 7 disposed inside the cartridge body, substantially in parallel with a side B of the cassette body being orthogonal to the side A. Thus, the tape 4 is connected to the take-up reel 2.

The side B is formed at a part with an opening 8, at which the tape 4 is exposed to the outside.

In addition, a capstan-inserting notch 9 in line with the opening 8 is provided adjacent to the pinch roller 7.

A V-shaped concave portion 10 is formed substantially in the middle between both the flanges 2′ and 3′ at the side A. Numeral 11 represents a lever turnable about a point 12. The turning lever 11 is provided at one end with an arm 14 by a pin 15 and in a manner to be turnable, the arm having a friction roller 13 made of, for example, rubber at an end remote from the lever. The other end of the turning lever 11 is exposed through an opening 16 formed in the V-shaped concave portion 10.

The turning lever 11 is imparted with a turning effort by a spring 17 so that usually the friction roller 13 may be held in press-contact with both the flanges 2′ and 3′ thereby to prevent them from turning.

Figure 4:
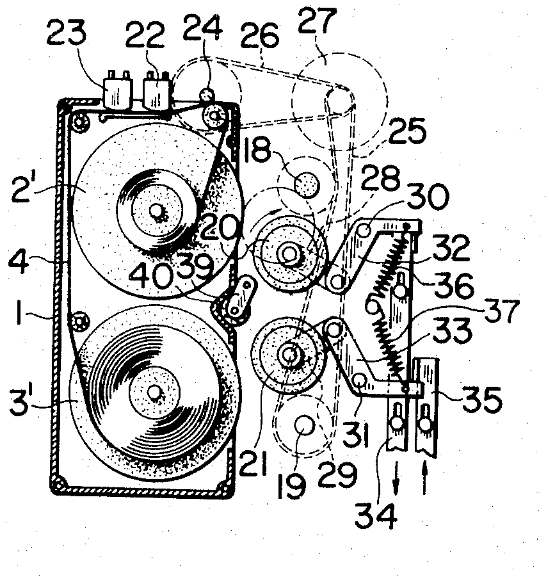
FIG. 4 is a view showing the relation between the cassette according to this invention and a tape-driving system of a magnetic recording and reproducing apparatus.

On the other hand, a magnetic recording and reproducing apparatus has a cassette-inserting hole which is formed on at least one side with an opening. As shown in FIG. 4, on the side of the inserting hole there are disposed reel-driving shafts 18 and 19. Adjacent to the reel-driving shafts 18 and 19, movable idle wheels 20 and 21 are respectively provided. On the interior side of the inserting hole, there are provided a magnetic head 22 for recording and reproduction, an erasing head 23 and a capstan 24. The reel-driving shafts 18, 19 and the capstan 24 have the turning force of a motor 27 transmitted thereto by belts 25 and 26, respectively.

The idlers 20, 21 are rotatably mounted at the corresponding ends of idler arms 28, 29, whose respective ends remote from the first-mentioned ends are coupled to the corresponding ends of turning arms 32, 33 turnable about turning pins 30, 31.

The turning arms 32, 33 are coupled at the respective ends remote from the above-mentioned ends to sliding levers 34, 35. By virtue of the forces of springs 36, 37, the idlers 20, 21 are usually urged to disengage from the reel-driving shafts 18, 19, respectively.

When the cassette constructed as described above is inserted from the side B into the cassette-inserting hole, the magnetic heads 22, 23 will enter the interior of the cassette body 1 through the opening 8 thereof and will be brought into contact with the magnetic tape 4.

The flanges 2′, 3′ of the take-up and supply reels exposed to the outside from the cassette body are disposed such that, in this case, they are opposed to the reel-driving shafts 18, 19, respectively.

Accordingly, if the sliding lever 34 is now slid in the direction of the arrow in FIG. 4 to move the idle wheel 20 into a position as shown by a dotted line so as to interpose it in press-contact between the flange 2′ and the reel-driving shaft 18 and if the reel-driving shaft 18 is rotated in the direction of the arrow as shown, then the tape 4 will travel from the supply reel 3 to the take-up reel 2 and will be recorded or reproduced in the traveling section by the magnetic head 22. To rewind the tape, either the rotation of the capstan 24 is stopped, or the sliding lever 35 is slid in the direction of the arrow whereby the turning effort of the reel-driving shaft 19 is transmitted through the tape 4 to the supply reel 3 by means of the idler 21.

Numeral 38 indicates a head pad mounted in the cassette, while numeral 39 represents an arm disposed such that one end thereof is rotatably mounted on the body of the apparatus and that a roller 40 provided at the front end thereof is forcibly held on the side A of the inserted cassette body 1. The roller 40 engages the V-shaped concave portion 10 of the cassette body 1 thereby to control its position. Therewith, it presses one end of the turning lever 11 thereby to turn the lever against the bias of the spring 17, thus disengaging the friction roller 13 from the flanges 2' and 3'.

Figure 5:
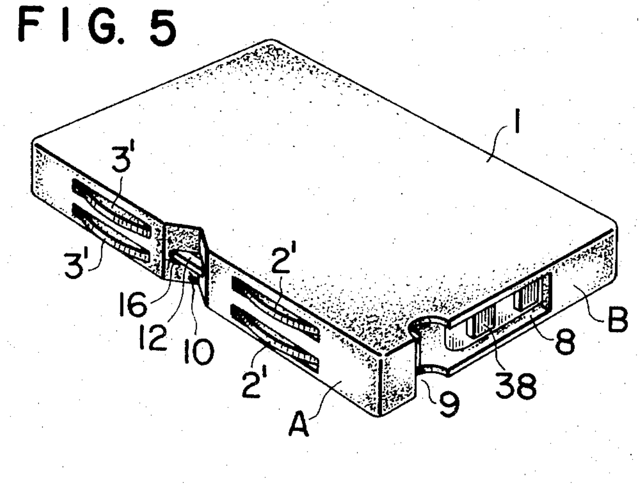
FIG. 5 is a perspective view showing another embodiment of the cassette according to this invention.

As shown in FIG. 5, it is also possible that the reel flanges be provided on both sides of each reel, with the two flanges of each reel being exposed from the cassette body 1 to the exterior. In addition, the reel flanges 2', 3' are not always required to protrude from the cassette body 1, but they are only required to be exposed in a manner to permit press-contact with the idle wheels 20, 21.

Figure 6:
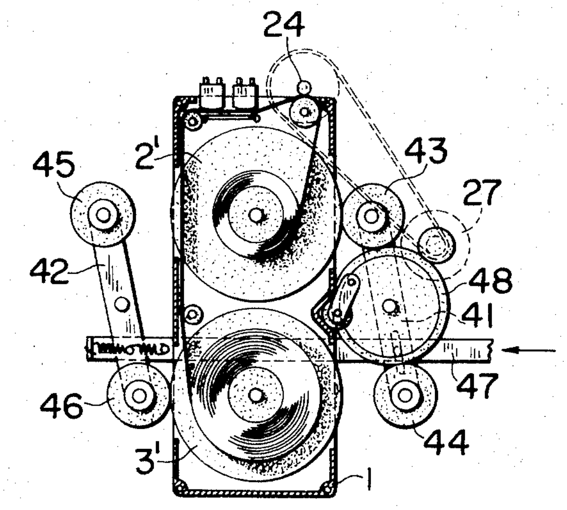
FIGS. 6 to 8 are views showing the relations between still further embodiments of the cassette according to this invention and tape-driving systems of magnetic recording and reproducing apparatus, respectively.

FIG. 6 illustrates another embodiment.

In this figure, numeral 1 designates a cassette body, which has substantially the same construction as the previous one. A difference resides in that each of the flanges 2', 3' projects on both sides of the cassette body 1.

On the other hand, on both sides of the cassette-inserting hole of the magnetic recording and reproducing apparatus, there are disposed arms 41, 42 each being constructed to be rotatable at the central part. Tape-driving idlers 43, 44 are provided at both ends of the arm 41, while friction rollers 45, 46 are provided at both ends of the arm 42. The arms 41 and 42 are linked by a sliding lever 47, and are constructed so as to turn in interlock relation with the sliding lever 47.

Represented at 48 is an idler usually held in contact with the idlers 43, 44. The idler 48 usually imparts turning efforts from the motor 27 to the idlers 43, 44.

Under the state in FIG. 6, the reel flange 2' and the idler 43 are pressed in contact with each other to sequentially wind the tape 4 on the take-up reel 2, while the reel flange 3' is held in press-contact with the friction roller 46 to impart a suitable tension to the tape 4.

To feed back the tape, the sliding lever 47 is moved in the direction of the arrow thereby to turn the arms 41, 42, so that the reel flange 3' and the driving roller 44, and the reel flange 2' and the friction roller 45 are respectively brought into press-contact with each other.

Of course, when the cassette is placed in and out of the apparatus, the arms 41, 42 are positioned in parallel with the longer sides of the cassette, with the driving rollers 43, 44 and the friction rollers 45, 46 being out of contact with the reel flanges 2', 3'.

In case where the tape is used both ways, this will be facilitated with the flanges which are exposed on both sides of the cassette, by turning the cassette over and inserting it into the apparatus.

Figure 7:
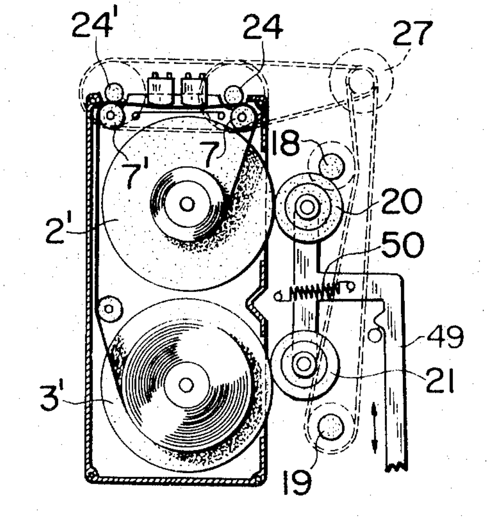

FIG. 7 shows still another embodiment.

A particular difference of the modification in FIG. 7 from the embodiment in FIGS. 1 to 4, resides in that the guide post 6 also performs as a pinch roller 7'. Thereby, upon insertion of the cassette into the apparatus, two capstans 24 and 24' disposed in the body of the apparatus are respectively brought into press-contact with the pinch rollers 7 and 7' through the tape 4, thus providing the double-capstan system.

In the modified embodiment in FIG. 7, idlers 20 and 21 are disposed at both ends of a sliding lever 49 movable along the side A of the inserted cassette body, with the idle wheels 20 and 21 being urged to be usually kept in contact with the flanges 2' and 3' by a spring 50, respectively. Thus, the sliding lever 49 is moved in the direction of an arrow, whereby the turning effort of the driving shaft 18 is transmitted to one of the flanges (2' in the case of the illustration) by means of one of the idlers, while the other idler serves as a friction roller.

Figure 8:
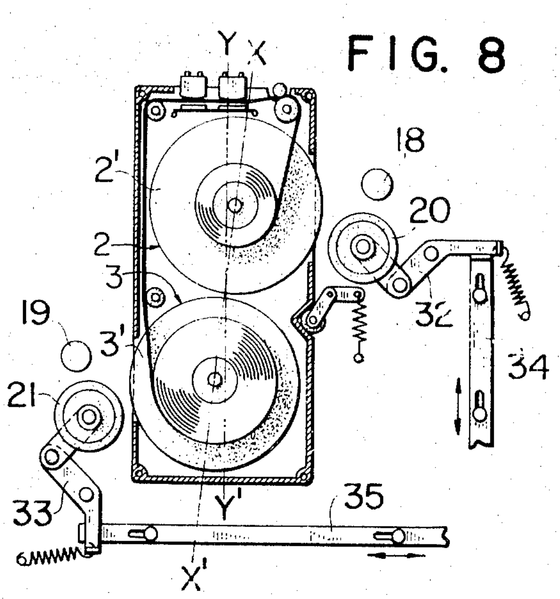

Referring to FIG. 8, a line X—X' between the centers of rotation of the reels 2 and 3 is inclined with respect to the central axis Y—Y' of the cassette body, and the flanges 2' and 3' are protruded from the opposite sides, respectively. With such a construction, the interior of the cassette body being a rectangular parallelepiped may be efficiently used. Also in this case, the idlers 20, 21 and the driving shafts 18, 19 are located in adjacency to the corresponding flanges 2', 3' exposed, whereby either one combination of the former elements are pressedly engaged with the corresponding one of the latter members as may be needed.

Figure 9:
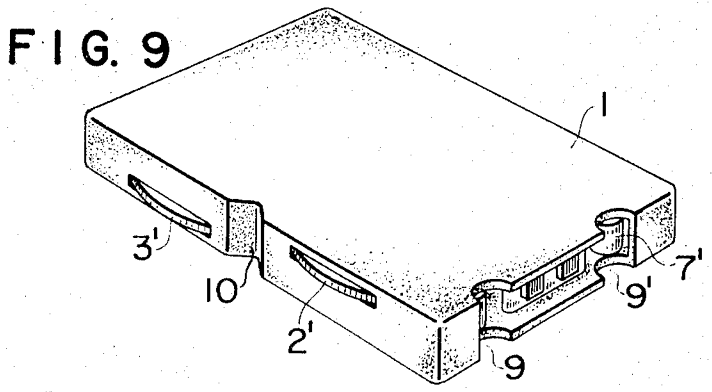
FIG. 9 is a perspective view showing a yet further embodiment of this invention.
Figure 10:
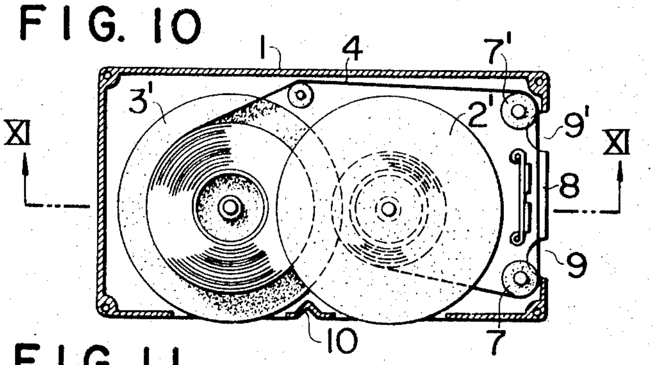
FIG. 10 is a sectional view, in plan, of the embodiment in FIG. 9.
Figure 11:
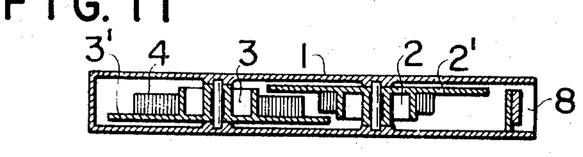
FIG. 11 is a sectional view taken along a line XI—XI in FIG. 10.

FIGS. 9 to 11 illustrate a still further embodiment, in which the reels 2 and 3 have the respective reel flanges 2' and 3' on only the sides different from each other. In addition, as seen in FIGS. 10 and 11, the reel flanges 2' and 3' are disposed within the cassette body in a manner to be partially overlapped. The respective outer peripheries of the flanges are outwardly protruded from one side A of the tape-cassette body.

Such construction in which the reel flanges are disposed on only the sides different from each other and with partial overlapping will permit the arrangement of the axes of both the reels to be in proximity to each other and will enable making smaller the size of the entire cassette to that extent.

Figures 12, 13:
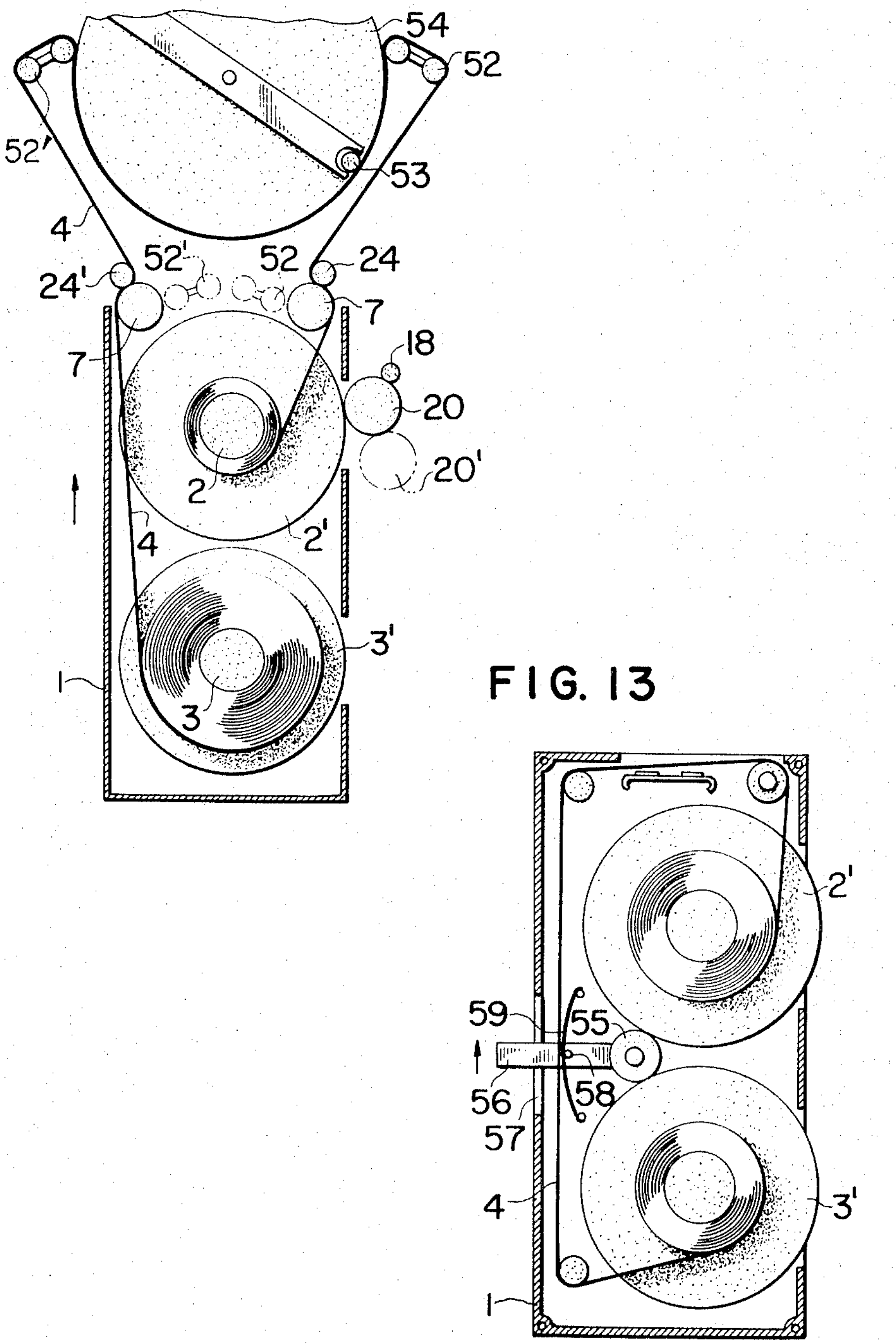
FIG. 12 is a sectional view, in plan, showing still another embodiment of this invention.
FIG. 13 is a sectional view, in plan, showing a further embodiment of this invention.

FIG. 12 illustrates an application of the system in which the tape is pulled out from the cassette body and is then wound round a tape guide containing therein a rotary head. The cassette body 1 is insertd into the apparatus in the direction of the arrow. Before the insertion, the idler 20 occupies a position 20' shown by a dotted line, while wound-round guides 52, 52' movably mounted in the apparatus are located at positions shown by dotted lines. The guides ascend with the cassette body inserted and enter the interior of the cassette body. Thereafter, they move to positions shown by solid lines, at which the tape 4 is wound by somewhat more than 180° round the tape guide 54 containing therein the rotary head 53 (in the case of two heads).

In this case, at least one of the capstans 24 and 24' is constructed so as to freely rotate till the tape 4 is wound round the tape guide 54 and to be coupled with a driving source for the first time when the tape is driven after completion of the loading of the tape.

FIG. 13 shows another embodiment of the friction roller 13 in FIG. 2. The modification is constructed so as to prevent the tape reels from unnecessarily rotating during non-use and to impart a suitable tension to the reel on the supply side during use.

The drive system for the tape is the same as that shown in FIG. 2, and the explanation thereof is omitted.

Referring to FIGS. 13 and 14, numeral 55 designates a friction roller made of, for example, hard rubber. It is rotatably mounted at one end of a moving arm 56.

During non-use, the moving arm 56 has the other end projected to the outside through an opening 57 formed in a side of the cassette body 1. A pin 58 disposed at the central part of the moving arm 56 is pressed in such a direction that the friction roller 55 is brought into contact with the flanges 2′ and 3′, by means of a leaf spring 59 both ends of which are fixed to the cassette body 1. Thus, the moving arm 56 is fixed with the roller 55 pressed to both the flanges 2′ and 3′. Under this state, the rotation of both the reels are kept stopped by the roller 55.

Figure 14A:
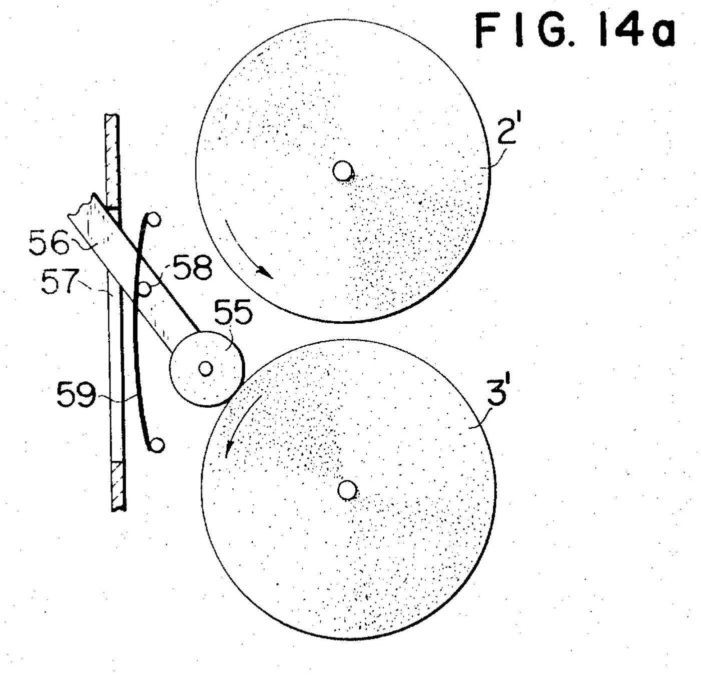
FIGS. 14*a* and 14*b* are plan views of the essential parts for explaining the operation of the embodiment in FIG. 13, respectively.
Figure 14B:
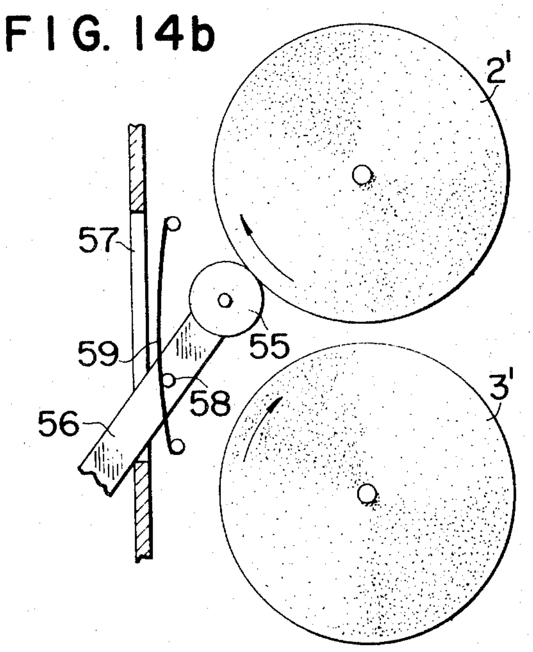

On the other hand, during recording and reproduction, that end of the moving arm 56 which is exposed to the exterior is moved in the direction of the arrow in FIG. 13. Then, as shown in FIG. 14*a*, the roller 55 is held in contact only with the supply-reel flange 3′, thereby imparting suitable braking to the supply reel and a tension to the tape. During rewinding of the tape, the roller 55 is positioned as shown in FIG. 14*b*.

In this way, the modified friction roller is under the state in FIG. 13 and prevents the turning of both the reels during non-use, while it serves to exert control upon either one of the reels during use.

What is claimed is:

1. Apparatus for driving a magnetic tape, comprising: a cassette body having openings formed on two opposed sides thereof; fixedly positioned supply and take-up reels rotatably mounted in said cassette body, the centers of said reels lying on a line which forms an acute angle with the longitudinal axis of said cassette body, said reels having flanged portions extending out of said cassette body through said openings, one on each of said opposed sides of said cassette body; rollers positioned adjacent the exposed portion of each of said flanged portions; and means for selectively engaging each of said rollers with its cooperating flanged portion to drive said supply and take-up reels for winding and rewinding a magnetic tape on said reels.

2. Apparatus for driving a magnetic tape, comprising: a cassette body having openings formed on at least one side thereof; supply and take-up reels rotatably mounted in said cassette body, said reels having flanged portions extending out of said cassette body through said openings; first and second rollers positioned adjacent the exposed flanged portions of said supply and take-up reels, respectively, for alternately transmitting a rotating motion to said reels for winding and rewinding a magnetic tape on said reels; lever means coupled with said first and second rollers for selectively engaging said rollers with their respective cooperating flanged portions to drive said supply and take-up reels; an idler member; and means rotating said idler member in one direction; wherein said openings are formed on the same side wall of said cassette body; and wherein said lever means comprises a sliding lever and an arm connected to said sliding lever and mounted for rotation about the axis of rotation of said idler member, said first and second rollers being mounted on said arm in contact with said idler member, said arm being rotated by sliding movement of said sliding lever to selectively engage said first and second rollers in pressure contact with the exposed flanged portions of said supply and take-up reels, respectively, to transmit a rotating motion of said idler member to the selected one of said supply and take-up reels.

3. The apparatus according to claim 2, further comprising: further openings formed in a side wall of said cassette body opposite the first mentioned side wall; a second arm connected to said sliding lever and mounted for rotation about a central axial point; third and fourth friction rollers mounted on opposite end portions of said second arm; said first and second arms being interlocked with each other through said sliding lever such that when one of said first and second rollers is selectively engaged with its associated reel, a corresponding one of said third and fourth rollers is engaged with the other reel.

* * * * *